United States Patent Office 3,501,551
Patented Mar. 17, 1970

3,501,551
PROCESS FOR PRODUCING NORMAL BUTENE POLYMERS
John C. Heidler, Highland, Ind., and Robert J. Lee, Dolton, Ill., assignors to Standard Oil Company, Chicago, Ill., a corporation of Illinois
Continuation of application Ser. No. 564,218, July 11, 1966. This application Mar. 19, 1969, Ser. No. 809,479
Int. Cl. C07c 3/18, 5/28; C08f 1/30
U.S. Cl. 260—683.15                3 Claims

ABSTRACT OF THE DISCLOSURE

Preparation of normal butylene polymers having molecular weights in the range of about 200–750, comprises reacting in liquid phase a $C_{3-5}$ hydrocarbon mixture containing isobutylene and normal butylenes as substantially the only olefins present with an aluminum chloride catalyst to form a reaction mixture containing only isobutylene polymers; separating the isobutylene polymers from the reaction mixture and thereafter treating the mixture with a Friedel Crafts catalyst to form a reaction mixture containing normal butylene polymers; and recovering said normal butlyene polymers from the last reaction mixture. The polymerization of the normal butylene is shown using an equimolar mixture of aluminum chloride and isopropyl chloride as the catalyst system and temperatures of 50–150° F.

---

Figure 1:
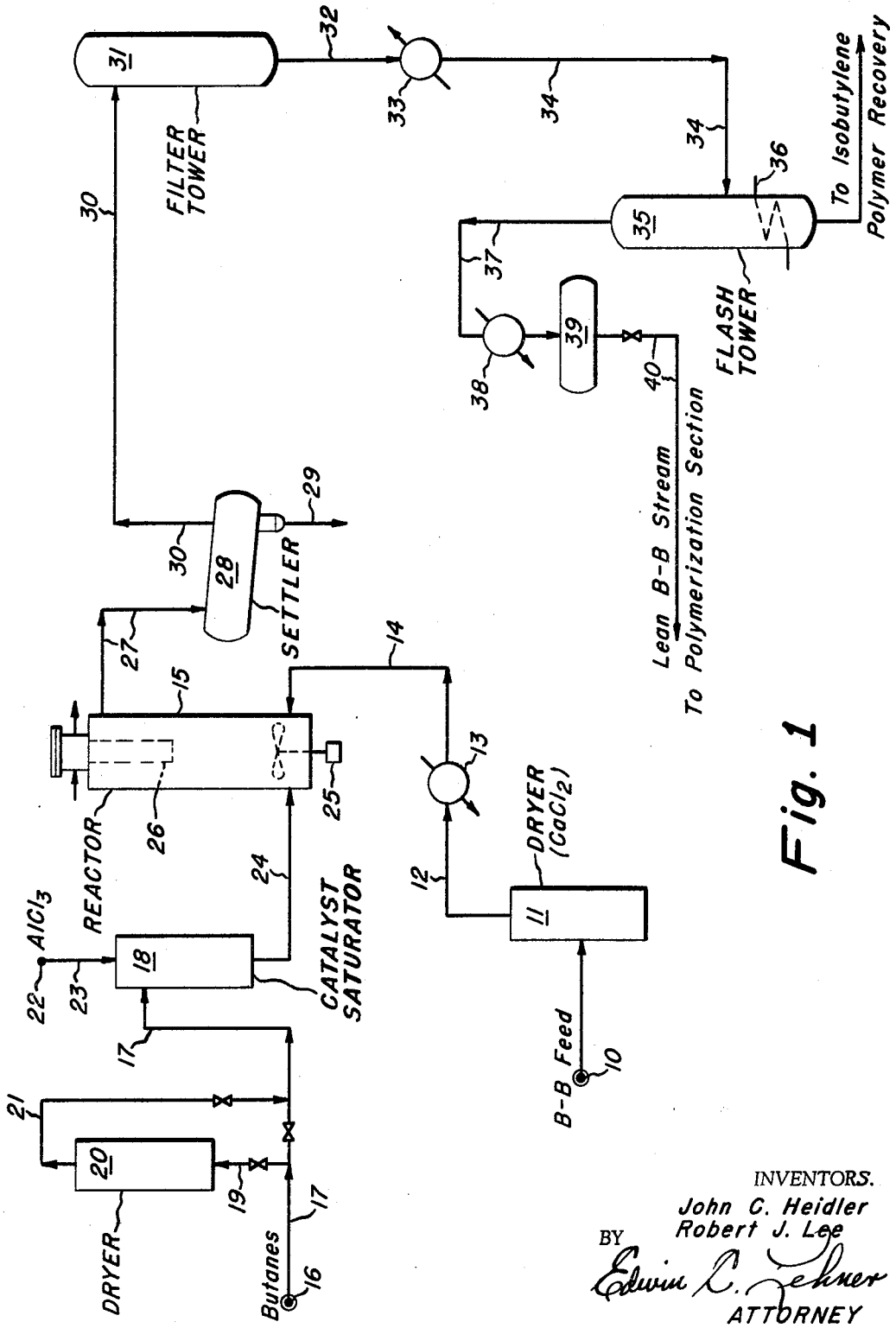

This application is a continuation of application Ser. No. 564,218 filed July 11, 1966 and now abandoned.

This invention relates to novel viscous liquid normal butene polymers especially suitable for use in the alkylation of aromatic hydrocarbons, particularly mononuclear aromatic hydrocarbons, and to an improved method for producing such polymers.

It has long been known that normally gaseous olefins can be converted to viscous liquid polymers by means of solid aluminum chloride or by means of liquid aluminum chloride complexes. A well-known, and usually used olefin feedstock for such polymerization is a petroleum refinery butane- and butylene-containing stream, referred to as a "B-B stream." The polymerization of a typical butane-butylene refinery stream with aluminum chloride to produce polymers having molecular weights in the range of from about 900 to about 5,000 is an established art.

In this process, the primary products, obtained from the polymerization of a typical butane-butylene refinery stream with aluminum chloride by the judicious choice of polymerization temperature and the percent conversion of the isobutylene monomer in such B-B refinery stream, are polymers having molecular weights in the range of from about 900 to about 5,000. Polymers having molecular weights of less than about 900, representing from about 10 to about 30 percent of the total polymer, have been used for alkylating mononuclear aromatics, such as benzene, xylenes, and toluene; however, the yield of alkylates from such polymers have resulted in undesirable low yields.

It is an object of the present invention to provide an improved method of preparing normal butylene polymers having molecular weights in the range of about 200–750 from a butane-butylene refinery stream suitable for alkylating mononuclear aromatic hydrocarbons. It is another object of this invention to provide a method for obtaining polymers from a butane-butylene refinery stream essentially free of isobutene, which polymers are particularly suitable for alkylating benzenes. Other objects and advantages of the present invention will become apparent as the detailed description thereof proceeds.

Briefly, the invention employs a liquid phase poymerization system wherein aluminum chloride catalyst dissolved and/or dispersed in butane is reacted in a first polymerization section with a petroleum stream containing isobutylene and normal butylenes, referred to hereinafter as a "B-B stream," at low temperatures to form a product mixture comprising essentially isobutylene polymers, unreacted butanes, and normal butylenes. The product mixture from the polymerization reactor is flashed to obtain a bottoms fraction comprising essentially isobutylene polymers, and an overhead mixture, substantially free of isobutylene, comprising essentially butane and butylenes, referred to hereinafter as a "Lean B-B Stream," and polymerizing said overhead mixture with aluminum chloride, or $BF_3$, catalyst at a higher temperature than used in the first polymerization section to obtain a mixture of normal butylene polymers having molecular weights in the range of about 200–750 essentially free of isobutylene polymers.

Figure 2:
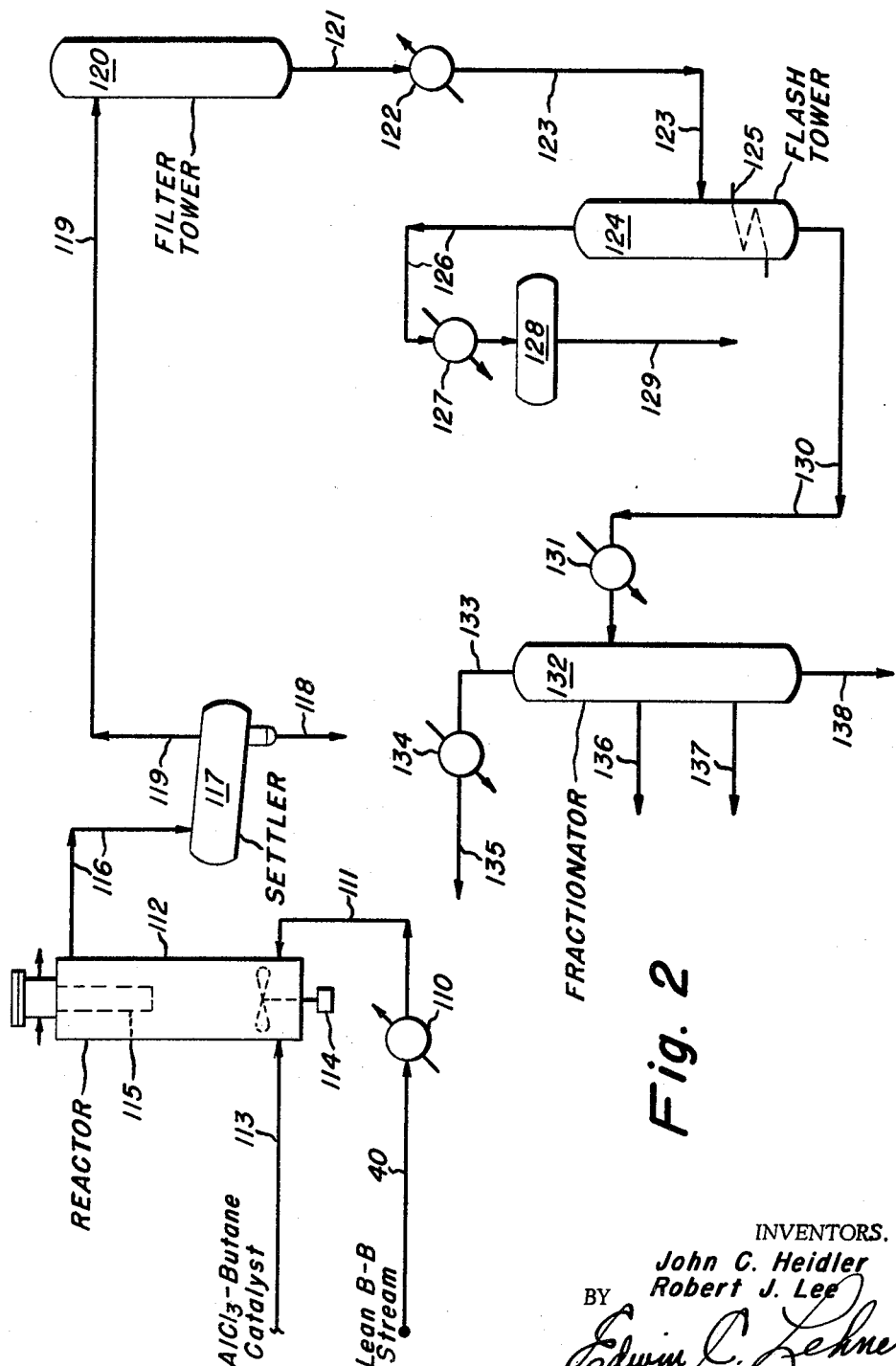

The invention will be more fully described from the following detailed description of a specific example read in conjunction with the accompanying drawings, which form a part of this specification, wherein:

FIG. 1 is a schematic flow diagram of a first polymerization section for the polymerization of a B-B stream, and FIG. 2 is a schematic flow diagram of a second polymerization section for the polymerization of a Lean B-B Stream.

While the invention is applicable to liquid phase polymerization of mixtures of isobutylene and normal butylenes, it is primarily directed to the polymerization of mixtures of isobutylene and normal butylenes associated with butanes in the B-B stream. In this example, the charging stock is a B-B refinery stream, having the following approximate composition:

|  | Percent |
|---|---|
| Propane | 1.2 |
| Propylene | 0.7 |
| n-Butane | 10.7 |
| Isobutane | 26.9 |
| Butene-1 | 12.5 |
| Cis-2-butene | 9.2 |
| Trans-2-butene | 14.8 |
| Isobutylene | 22.8 |
| Pentane | 1.3 |

A two-section process for the polymerization of a refinery B-B stream is described hereinafter.

FIRST POLYMERIZATION SECTION

Referring to FIG. 1, charging B-B feedstock from source 10 is preferably washed with about a 10% NaOH solution to remove mercaptan sulfur, if present, from the feed and then passed through a suitable dryer 11 charged with calcium chloride. The dried feedstock is then passed through line 12 and one or more heat exchangers or coolers 13 to cool the feed stream to a temperature of about 0° F. to 65° F., suitably about 35° F. The cooled feed stream is then passed via line 14 to the bottom of reactor 15 and charged thereinto.

A butanes stream from source 16, preferably depropanized, is passed via valved line 17 to the top of saturator 18. The butanes stream should be essentially free of any water, and if necessary is passed from line 17, via valved line 19, through calcium chloride dryer 20, and thence via valved line 21 to line 17 to saturator 18. Saturator 18 is charged with aluminum chloride from source 22 via line 23 and suitable hopper means (not shown). The dry butanes stream to the saturator is heated by suitable heat exchanger means to a temperature of about 175° to 230° F., suitably 210° F. and at about 395 p.s.i.a. The saturator is operated at a temperature of about 200° F. and under sufficient pressure to maintain a liquid phase.

The aluminum chloride may be added to the saturator in the form of lump or powdered anhydrous aluminum chloride and may be distributed throughout the saturator or maintained in beds or other suitable means. While one saturator is diagrammatically shown in the drawing, in practice, banks of at least two such saturators will be used so that while the aluminum chloride from one is being used, the other saturator or saturators can be in the process of being refilled with aluminum chloride. Optionally, known promoters, such as an alkyl chloride, e.g. isopropyl chloride, may be used with the AlCl$_3$ catalyst.

The effluent from saturator 18, butanes having dissolved therein about 5 pounds aluminum chloride per barrel butane, is passed via line 24 into the bottom of reactor 15 wherein it is mixed with the B-B stream feed by means of suitable agitator means, such as stirrer 25. A temperature of about 0° to about 65° F. is maintained in reactor 15 by suitable refrigeration means 26, such as by propane refrigeration.

Product effluent from the top of reactor 15, consisting of polymerized isobutylene, aluminum chloride-hydrocarbon complex, and unreacted hydrocarbons, such as normal butylenes and butanes, is passed via line 27 to settler 28 wherein the bulk of the entrained catalyst complex is settled out and withdrawn via line 29 for disposal. The effluent from settler 28, consisting of isobutylene polymers, a small amount of entrained polymer-aluminum chloride-complex and the unreacted hydrocarbons, is passed via line 30 to filter tower 31, which may be a bed of sand, gravel, limestone (Chat), fuller's earth or attapulgus clay, for removing any entrained aluminum compounds.

The product filtrate from filter tower 31, consisting of isobutylene polymers and unreacted hydrocarbons, comprising chiefly normal butylenes and butanes, is passed via line 32, through heater 33, and line 34 to flash tower 35 operated at a pressure of about 80–100 p.s.i.g. with a top temperature of about 120–170° F. and a bottom temperature of about 290–310° F. by means of heater 36.

In flash tower 35, unreacted hydrocarbons, chiefly normal butylenes and butanes, are taken overhead through line 37, condensed in cooler 38, and collected in receiver 39. This condensed overhead collected in receiver 39, hereinafter referred to as "Lean B-B Stream," having the following approximate composition:

| | Percent |
|---|---|
| Propane | 2.7 |
| Propylene | 0.7 |
| n-Butane | 18.3 |
| Isobutane | 40.4 |
| Butene-1 | 12.0 |
| cis-2-butene | 9.4 |
| trans-2-butene | 14.7 |
| Isobutylene | 0.6 |
| Pentane | 1.2 | is removed from receiver 39, via valved line 40, and polymerized in a second polymerization section, as hereinafter described.

Isobutylene polymers are removed from the bottom of flash tower 35, and fractionated into polymers of desired molecular weights by well-known means.

SECOND POLYMERIZATION SECTION

Referring to FIG. 2, Lean B-B Stream from receiver 39 (FIG. 1) is passed via valved line 40, through heat exchanger 110, wherein it is heated to a temperature of from about 25° F. to about 300° F., and via line 111 to the bottom of reactor 112.

Aluminum chloride-butane catalyst, consisting of butanes having dissolved and/or dispersed therein about 5 pounds aluminum chloride per barrel butane, prepared as hereinbefore described, is passed via line 113 into the bottom of reactor 112, wherein it is mixed with the Lean B-B Stream feed by means of suitable agitator means, such as stirrer 114. A temperature of about 25–300° F. is maintained in reactor 112 by suitable heating means 115.

Product effluent from the top of reactor 112, consisting of polymerized normal butylenes, aluminum chloride-hydrocarbon complex, and unreacted hydrocarbons, such as normal butylenes and butanes, is passed via line 116 to settler 117 wherein the bulk of the entrained catalyst complex is settled out and withdrawn via line 118 for disposal. The effluent from settler 117, consisting of normal butylene polymers, a small amount of entrained polymer-aluminum chloride-complex, and unreacted hydrocarbons, is passed via line 119 to filter tower 120, which may be a bed of sand, gravel, limestone (Chat), fuller's earth or attapulgus clay, for removing any entrained aluminum compounds.

The product filtrate from filter tower 120, consisting of normal butylene polymers and unreacted hydrocarbons, is passed via line 121, through heater 122, and line 123 to flash tower 124 operated at a pressure of about 80–100 p.s.i.g. with a top temperature of about 120–170° F. and a bottom temperature of about 290–310° F. by means of heater 125.

In flash tower 124, unreacted hydrocarbons, chiefly butanes, are taken overhead through line 126, condensed in cooler 127, and collected in receiver 128.

The overhead from flash tower 124, having the following approximate composition:

| | Percent |
|---|---|
| Propane | 2.4 |
| Propylene | 0 |
| n-Butane | 53.0 |
| Isobutane | 37.4 |
| Butene-1 | 0.2 |
| cis-2-butene | 0.5 |
| trans-2-butene | 5.2 |
| Isobutylene | 0 |
| Pentane | 1.4 | is removed from receiver 128 via line 129.

From the bottom of flash tower 124, the normal butylene polymers passes via line 130 through heater 131 to a polymer fractionating stripping tower 132, provided with suitable heating and steam stripping means (not shown), from which there is removed via line 133, condenser 134, and line 135 an overhead fraction within the gasoline distillation range; via line 136, an intermediate normal butylene polymer fraction of about 200 molecular weight; via line 137, a second intermediate normal butylene polymer fraction of about 300 molecular weight; and via line 138, a bottoms fraction of normal butylene polymer of about 600–700 molecular weight. It is to be understood that, depending upon the temperatures employed in tower 132, polymer fractions of different molecular weights are obtainable.

The distribution of the product from the polymerization of a lean B-B Stream, having the following composition:

| | Polymer |
|---|---|
| Propane | 2–3.5 |
| Propylene | 0.4–1 |
| n-Butane | 16–20 |
| Isobutane | 30–41 |
| Butene-1 | 11–13 |
| cis-2-butene | 8.5–10.5 |
| trans-2-butene | 13.5–16 |
| Isobutylene | 0–2.0 |
| Pentane | 1–3.5 | is controlled largely by the reactor temperature. The following data illustrate the effect of the reactor temperature on product distribution from the lean B-B Stream feed of the example, having hereinbefore described composition:

| Products (percent) | Reactor temperature (° F.) | | | |
|---|---|---|---|---|
| | 50 | 100 | 150 | 200 |
| 400° E.P. Gasoline | 5.6 | 9.6 | 11.8 | 16.9 |
| 220 Molecular Weight Polymer | 13.0 | 15.4 | 20.0 | 24.3 |
| 330 Molecular Weight Polymer | 81.4 | 55.2 | 53.3 | 58.8 |
| Bottoms (600–700 MW) | | 19.8 | 14.4 | |

The operating conditions used in the above polymerization run were as follows:

| Reactor temperature (° F.) | 50 | 100 | 150 | 200 |
|---|---|---|---|---|
| Olefin conversion (percent) | 94.0 | 59.6 | 66.6 | 75.5 |
| Mole percent AlCl$_3$ | 0.136 | 0.127 | 0.125 | 0.171 |
| Isopropyl chloride-promoter | 0.136 | 0.127 | 0.125 | 0 |
| Average residence time in reactor (min.) | 12 | 25 | 25 | 25 |

The herein described invention provides a process for increasing the yields of lower molecular weight normal butylene polymers, without decreasing the yields of higher molecular weight isobutylene polymers. Further, fractions of the lower molecular weight normal butylene polymers can be varied by controlling the reaction temperature of the second polymerization section reactor. The lower molecular weight normal butylene polymers, essentially free of isobutylene polymers, have greater thermal stability than the lower molecular weight polybutenes heretofore produced as a by-product stream from a single stage B-B stream polymerization process.

Percentages herein given are weight percentages unless otherwise stated.

We claim:
1. The method of preparing normal butylene polymers from a hydrocarbon mixture containing isobutylene and normal butylenes, which method comprises:
   (a) reacting in liquid phase a C$_{3-5}$ hydrocarbon mixture containing isobutylene and normal butylene as substantially the only olefins present with an aluminum chloride catalyst at a temperature of from about 0° F. to about 65° F. to polymerize substantially only said isobutylene and form a reaction mixture consisting of isobutylene polymers and unreacted hydrocarbons including normal butylenes;
   (b) fractionating the reaction mixture to obtain a fraction (i) consisting of said isobutylene polymers and a fraction (ii) consisting of unreacted hydrocarbons containing less than about 2% isobutylene and including normal butylenes;
   (c) reacting in liquid phase said fraction (ii) with a catalyst system consisting of about equimolar proportions of aluminum chloride and isopropyl chloride at a temperature of from about 50° F. to about 150° F. to polymerize normal butylenes in said fraction (ii) and form a reaction product mixture containing normal butylene polymers; and
   (d) separating normal butylene polymers having molecular weights in the range of about 200–750 from said product mixture.

2. The method of claim 1 wherein the normal butylene polymers separated from the product mixture in step (d) are fractionated to obtain a normal butylene polymer fraction having molecular weights in the range of from about 200 to about 250 and a normal butylene polymer fraction having molecular weights in the range of from about 300 to about 350.

3. The process of claim 1 wherein the hydrocarbon fraction (ii) in steps (b) and (c) consists of

| | Percent |
|---|---|
| Propane | 2–3.5 |
| Propylene | 0.4–1 |
| n-Butane | 16–20 |
| Isobutane | 30–41 |
| Butene-1 | 11–13 |
| cis-2-butene | 8.5—10.5 |
| trans-2-butene | 13.5–16 |
| Isobutylene | 0–2.0 |
| Pentane | 1–3.5 |

References Cited

UNITED STATES PATENTS

| 2,320,256 | 5/1943 | Bailey et al. | 260—683.15 |
| 2,469,725 | 5/1949 | Heinrich | 260—683.15 |
| 2,657,246 | 10/1953 | Schneider et al. | 260—683.15 |
| 2,678,957 | 5/1954 | Fontana et al. | 260—683.15 |
| 3,119,884 | 1/1964 | Allen et al. | 260—683.15 |

PAUL M. COUGHLAN, JR., Primary Examiner